United States Patent
Benoit et al.

(10) Patent No.: US 7,920,323 B2
(45) Date of Patent: Apr. 5, 2011

(54) THERMALLY STABLE MULTILAYER MIRROR FOR THE EUV SPECTRAL REGION

(75) Inventors: Nicolas Benoit, Jena (DE); Torsten Feigl, Jena (DE); Norbert Kaiser, Jena (DE); Sergiy Yulin, Jena (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 692 days.

(21) Appl. No.: 11/793,322

(22) PCT Filed: Dec. 23, 2005

(86) PCT No.: PCT/DE2005/002315
§ 371 (c)(1),
(2), (4) Date: Jan. 7, 2008

(87) PCT Pub. No.: WO2006/066563
PCT Pub. Date: Jun. 29, 2006

(65) Prior Publication Data
US 2008/0088916 A1      Apr. 17, 2008

(30) Foreign Application Priority Data
Dec. 23, 2004   (DE) .................. 10 2004 062 289

(51) Int. Cl.
*F21V 9/04*      (2006.01)
*G02B 1/10*      (2006.01)
(52) U.S. Cl. ........................ 359/359; 359/587
(58) Field of Classification Search .......... 359/350–361, 359/577–590
See application file for complete search history.

(56) References Cited

U.S. PATENT DOCUMENTS

| | | | |
|---|---|---|---|
| 5,310,603 A * | 5/1994 | Fukuda et al. | 428/446 |
| 5,958,605 A | 9/1999 | Montcalm et al. | |
| 6,143,041 A * | 11/2000 | Nozawa et al. | 29/623.1 |
| 6,160,867 A | 12/2000 | Murakami et al. | |
| 6,396,900 B1 | 5/2002 | Barbee et al. | |
| 6,508,561 B1 | 1/2003 | Alie et al. | |
| 2003/0043456 A1 | 3/2003 | Singh | |

(Continued)

FOREIGN PATENT DOCUMENTS

DE        100 11 547 C2        9/2001

(Continued)

OTHER PUBLICATIONS

T.W. Barbee, "Multilayers for x-ray optics", Optical Engineering, vol. 25, pp. 893-915, 1986.

(Continued)

*Primary Examiner* — Thong Nguyen
(74) *Attorney, Agent, or Firm* — Slater & Matsil, L.L.P.

(57) ABSTRACT

In a multilayer mirror (1) for the reflection of EUV radiation containing a large number of alternating molybdenum layers (4) and silicon layers (3), a barrier layer (5) containing a silicon nitride or a silicon boride is included at a number of interfaces between the molybdenum layers (4) and the silicon layers (3). As a result of the barrier layers (5) of a silicon nitride or of a silicon boride, high thermal stability is achieved, in particular high long-term stability at temperatures of more than 300° C., whilst at the same time achieving high reflectivity in the multilayer mirror. A multilayer mirror (1) of this type can, in particular, be used as a heatable collector mirror for an EUV radiation source.

22 Claims, 4 Drawing Sheets

U.S. PATENT DOCUMENTS

2004/0051984 A1* 3/2004 Oshino et al. .................. 359/845
2004/0121134 A1 6/2004 Bijkerk et al.

FOREIGN PATENT DOCUMENTS

| DE | 100 11 548 A1 | | 9/2001 |
|---|---|---|---|
| EP | 1 369 744 A1 | | 12/2003 |
| JP | 8-262198 | | 10/1996 |
| JP | 2006-93454 | * | 4/2006 |
| WO | WO 99/24851 | | 5/1999 |
| WO | WO 03/081187 | | 10/2003 |
| WO | WO 2004/053540 | | 6/2004 |
| WO | WO 2004/092693 | | 10/2004 |
| WO | WO 2005/091887 | | 10/2005 |

OTHER PUBLICATIONS

E. Spiller et al., "Determination of thickness errors and boundary roughness from the measured performance of a multilayer coating", Optical Engineering, vol. 25, No. 8, pp. 954-963, Aug. 1986.

S. Braun et al., "Mo/Si Multilayers with Different Barrier Layers for Applications as Extreme Ultraviolet Mirrors", Japanese Journal of Applied Physics, vol. 41, pp. 4074-4081, 2002.

H. Takenaka et al., "Thermal Stability of Mo/C/Si/C Multilayer Soft X-ray Mirrors", Journal of Electron Spectroscopy and Related Phenomena, vol. 80, pp. 381-384, 1996.

D.G. Stearns et al., "Fabrication of high-reflectance Mo-Si multilayer mirrors by planar-magnetron sputtering", J. Vac. Sci. Technologies, vol. A 9, No. 5, pp. 2662-2669, 1991.

T. Feigl, "Heat resistance of EUV multilayer mirrors for long-time applications", Microelectronic Engineering, 57-58, pp. 3-8, 2001.

S. P. Vernon et al., "Ion-assisted sputter deposition of molybdenum-silicon multilayers", Applied Optics, vol. 32, No. 34, Dec. 1, 1993.

D.L. Windt et al., "Interface Imperfections in metal/Si multilayers", Journal of Applied Physics, vol. 71, No. 6, pp. 2675-2678, Mar. 15, 1992.

D.G. Stearns et al., "Nonspecular scattering from extreme ultraviolet multilayer coatings", Physica B, vol. 283, pp. 84-91, 2000.

J.M. Slaughter et al., "Structure and performance of Si/Mo multilayer mirrors for the extreme ultraviolet", Journal of Applied Physics, vol. 76, No. 4, pp. 2144-2156, Aug. 15, 1994.

S. Bajt et al., "Investigation of the amorphous-to-crystalline transition in Mo/Si multilayers", Journal of Applied Physics, vol. 90, No. 2, pp. 1017-1025, Jul. 15, 2001.

S. Yulin et al., "Interlayer transition zones in Mo/Si superlattices", Journal of Applied Physics, vol. 92, No. 3, pp. 1216-1220, Aug. 1, 2002.

Y. Hirai et al., "Soft x-ray polarization and magnetic circular dichroism measurement system", Journal of Electron Spectroscopy and Related Phenomena 80, pp. 381-384, 1996.

Bajt, S., et al., "Improved reflectance and stability of Mo/Si multilayers," Soft X-Ray and EUV Imaging Systems II, Proceedings of SPIE vol. 4506, 2001, pp. 65-75.

Takenaka, H., et al., "Design and fabrication of highly heat-resistant Mo/Si multilayer soft X-ray mirrors with interleaved barrier layers," Journal of Synchrotron Radiation, 1998, vol. 5, pp. 708-710.

* cited by examiner

THERMALLY STABLE MULTILAYER MIRROR FOR THE EUV SPECTRAL REGION

RELATED APPLICATIONS

This is a U.S. national stage of application No. PCT/DE2005/002315, filed on Dec. 23, 2005.

This patent application claims the priority of German patent application no. 10 2004 062 289.2 filed Dec. 23, 2004, the disclosure content of which is hereby incorporated by reference.

FIELD OF THE INVENTION

The invention concerns a thermally stable multilayer mirror for the extreme ultraviolet spectral range (EUV).

BACKGROUND OF THE INVENTION

Reflecting optical elements for use in the extreme ultraviolet spectral range (EUV), extending over wavelengths from about 10 nm to about 50 nm, can be implemented with multilayer mirrors, comprising as a rule a periodic sequence of layers containing a large number of thin-layer pairs. A thin-layer pair contains, generally speaking, two layers of different materials, and these should have the greatest possible difference in their optical constants in the range of wavelengths for which the component is intended to be used. At least one of these materials should exhibit the lowest possible absorption at the intended wavelength. The selection of the materials to be used in a multilayer mirror therefore depends primarily on the wavelength at which the optical component is intended to be used. In the EUV spectral range, therefore, there is an optimum pairing of materials for any particular wavelength range, usually only a few nanometers wide, where the optical contrast between the material layers guarantees high reflection.

For the wavelength range between about 12.5 and 14 nm, which is of great significance in particular for the development of optical systems for applications in EUV-lithography, multilayer mirrors using molybdenum and silicon as the material pair are preferred, as there is a particularly good optical contrast between these materials at the aforementioned wavelength range. Mo/Si (molybdenum/silicon) multilayer mirrors can, for instance, achieve a reflectivity of about 70% at a wavelength of 13.5 nm.

Reflectivity this high is of particular value for applications in which multiple reflections at multilayer mirrors takes place, since the reflectivity of the optical system as a whole falls in this case exponentially with the number of mirrors. In an arrangement of several mirrors, therefore, even a slight improvement in the reflectivity of a single mirror has a significant effect on the total reflectivity of the optical system. This is particularly true for optical systems used for EUV lithography, where, for instance, 11 multilayer mirrors may be used.

In order to achieve high reflectivity, it is particularly important to have the smoothest possible interfaces at the layer transitions between the molybdenum and silicon layers. On the other hand, however, the tendency of the molybdenum and silicon materials to form molybdenum silicide, $MoSi_2$ in particular, and to undergo interdiffusion processes at the interface is known, for instance from DE 100 11 547 C2. There is therefore a risk, particularly at relatively high application temperatures, that multilayer mirrors of this type will degrade, as a result of which the reflectivity is significantly reduced. In addition to a loss of reflectivity, the degradation resulting from the interdiffusion processes and the formation of molybdenum silicide is also associated with a reduction in the thickness of the pair of layers, also known as the period thickness. This drop in the period thickness leads the maximum reflectivity to be shifted to a shorter wavelength. The function of an optical system based on multilayer mirrors of this type can be significantly impaired, or even fully destroyed, by degradation processes of this type.

Improving the thermal stability of Mo/Si multilayer mirrors by introducing a barrier layer of $Mo_2C$ between each of the interfaces between the molybdenum layer and the silicon layer is known from DE 100 11 547 C2.

Further, DE 100 11 548 C2 describes the use of barrier layers of $MoSi_2$ to increase the thermal stability.

The systems of layers disclosed in the two publications mentioned above feature thermal stability, at least over a timescale of a few hours, up to 500° C. In comparison with a conventional Mo/Si multilayer mirror, however, they feature a comparably low reflectivity of less than 60%.

The introduction of barrier layers of $B_4C$ into Mo/Si multilayer mirrors in order to increase the reflectivity and/or the thermal stability is also known from U.S. Pat. No. 6,396,900 B1. While it is true that these layer systems are characterized by a comparatively high reflectivity of about 70%, the thermal stability, and in particular the long-term stability is not assured at temperatures of around 400° C. or above.

Laser plasma sources that emit radiation with a wavelength of about 13.5 nm are particularly used as the radiation source for the operation of optical systems applied to EUV lithography. Because the reflectivity of the optical system as a whole used in EUV lithography is relatively low as a result of the large number of mirrors, EUV radiation sources of this type must be operated at high powers to compensate for the reflection losses arising in the optical system. Close to high-powered EUV radiation sources of this type, EUV multilayer mirrors can be subjected to high temperatures. This is particularly true for an EUV multilayer mirror placed close to an EUV radiation source for the purposes of beam forming, for instance as what is known as the collector mirror.

There is therefore a need for multilayer mirrors that feature both high long-term thermal stability and high reflectivity.

SUMMARY OF THE INVENTION

One object of the invention is to provide a multilayer mirror for the EUV spectral region that features both high thermal stability, in particular a comparatively high long-term stability, and high reflectivity.

This and other objects are attained in accordance with one aspect of the invention directed to a multilayer mirror for EUV radiation comprising a plurality of alternating molybdenum layers and silicon layers, wherein at a plurality of interfaces between a molybdenum layer and a neighbouring silicon layer, there is a barrier layer containing a silicon boride.

In a multilayer mirror in accordance with an embodiment of the invention for EUV radiation that comprises a large number of alternating molybdenum and silicon layers, a barrier layer containing a silicon nitride, favourably $Si_3N_4$, or a silicon boride, favourably $SiB_4$ or $SiB_6$, is incorporated at several interfaces between a molybdenum layer and a neighbouring silicon layer.

In the context of the invention, the term "interface" refers to the transition region between a molybdenum layer and a silicon layer, including those cases in which, as a result of the barrier layer incorporated between them, the molybdenum and silicon layers are not directly adjacent to one another.

In the presence of the barrier layers of a silicon nitride or a silicon boride, the formation of molybdenum silicide and the interdiffusion at the interfaces between the molybdenum and silicon layers is advantageously reduced. The thermal stability, the long-term stability and the resistance to radiation of the multilayer mirror are thereby advantageously improved.

A multilayer mirror in accordance with the invention is particularly suitable for application at temperatures of more than 300° C., in particular in the temperature range from 300° C. up to 500° C. The quoted range, like all ranges stated herein, includes the stated limits.

A multilayer mirror in accordance with the invention has the particular advantage of high long-term stability at temperatures of more than 300° C., and in particular in the temperature range from 300° C. to 500° C. For instance, a multilayer mirror in accordance with the invention still exhibited no significant loss in the reflectivity and/or the period thickness even after operating for 100 h at a temperature of around 500° C.

Because of its thermal stability, a multilayer mirror in accordance with the invention can be used in the neighbourhood of an EUV radiation source such as a laser-plasma source.

In a preferred embodiment of the invention, the multilayer mirror is heated to a high operating temperature, for instance to 300° C. or more, preferably even to 400° C. or more, in order to reduce the accumulation of contaminants on the multilayer mirror. A heating device can be provided for this purpose, favourably attached to a substrate of the multilayer mirror. This is particularly advantageous in the case of a multilayer mirror that is located adjacent an EUV radiation source, as in this case the multilayer mirror can be contaminated by a target material used in the EUV radiation source, such as lithium, that is excited by a laser beam in order to emit EUV radiation, so impairing the reflectivity. By heating the multilayer mirror to an operating temperature of, preferably, around 400° C., the adhesion coefficient of the lithium, for instance, to a surface of the multilayer mirror is preferably minimized in such a way that even after an operating period of a hundred hours or more the reflectivity has not been significantly impaired.

In a preferred embodiment of the invention, a barrier layer containing a silicon nitride, favourably $Si_3N_4$, or a silicon boride, favourably $SiB_4$ or $SiB_6$, is included at all the interfaces between a molybdenum layer and a silicon layer. The barrier layers incorporated at all the interfaces impart a particularly high thermal stability to the multilayer mirror.

In a further preferable implementation of the invention a barrier layer containing a silicon nitride or a silicon boride is incorporated at those interfaces where, in the direction of growth, a molybdenum layer follows a silicon layer, whereas no barrier layer is incorporated at interfaces where, in the direction of growth, a silicon layer follows a molybdenum layer.

One advantage of this embodiment of the invention is that electromagnetic radiation that is reflected by the interference layer system formed by the multilayer mirror develops a standing electromagnetic wave within this interference layer system, with its nodes located at the interfaces at which, in the direction of growth, a molybdenum layer follows a silicon layer. The barrier layers are therefore located in this embodiment of the invention in regions of the interference layer system at which the electric field strength associated with the standing wave is low. The absorption within the barrier layers is therefore advantageously low.

The thickness of the barrier layers is, preferably, between 0.1 nm and 1.5 nm; thicknesses between 0.2 nm and 0.8 nm are particularly favourable. Barrier layers with this thickness are suitable for effectively preventing the interdiffusion or the formation of molybdenum silicide at the interfaces. On the other hand, they are still thin enough for the absorption within these barrier layers to be relatively low.

The multilayer mirror preferably contains between 40 and 70 pairs of layers. A pair of layers refers here to a silicon layer, its neighbouring molybdenum layer, and includes the adjacent barrier layer or barrier layers. Due to the limited penetration depth of the radiation in this region of the spectrum, a further increase in the number of pairs of layers would have only a minimal effect on the reflectivity of the multilayer mirror.

The multilayer mirror can, for instance, incorporate a periodic arrangement of silicon layers, molybdenum layers and barrier layers in which the thickness of the silicon layers, the molybdenum layers and of the barrier layers does not vary within the multilayer mirror. With a periodic multilayer mirror of this type, a high reflectivity can be achieved over a narrow spectral range around a specified wavelength $\lambda$.

The multilayer mirror can, however, within the context of the invention, also incorporate an aperiodic sequence of layers, within which the thicknesses of the silicon layers and/or the molybdenum layers vary. With an aperiodic multilayer mirror of this type it is possible to achieve a high reflectivity over a comparably broad range of wavelengths and/or angles of incidence, although the maximum reflectivity at any specified wavelength is less than it is in the case of a periodic multilayer mirror.

It is favourable to this invention if a covering layer is applied to the multilayer mirror, whose material and/or thickness differs from the layers of the multilayer mirror, particularly in order to protect the multilayer mirror from oxidation and contamination. In place of a single covering layer, it is also possible for two or more covering layers to be applied.

It is, for instance, possible for one or more covering layers not consisting of either molybdenum or silicon to be applied.

Particularly suitable materials for the covering layer include oxides, silicides, nitrides, carbides or borides; ruthenium, rhodium, scandium or zirconium are also possible. In particular, a covering layer applied to the multilayer minor can consist of the material used for the barrier layers, that is a silicon nitride or a silicon boride.

An improvement in the reflectivity of the multilayer mirror is favourably achieved if the multilayer mirror is applied to a substrate whose surface roughness is less than 0.2 nm. Surface roughness here is, for instance, understood as the rms roughness of the surface as may be determined from curve fitting to x-ray reflection curves measured using Cu—K$\alpha$ radiation.

The multilayer mirror can, for instance, be applied to a semiconductor substrate such as, for instance, a silicon wafer. Substrates consisting of SiC are also particularly suitable. Further, the substrate can consist of glass or glass ceramic. It is particularly favourable for the substrate to consist of a glass or a glass ceramic having a low coefficient of thermal expansion, such as ULE (ultra low expansion) glass or Zerodur. In this way, mechanical stresses that could arise at high operating temperatures, in particular if the multilayer mirror is heated to an operating temperature of, for instance, around 400° C., are favourably reduced.

The substrate may, for instance, be a plane substrate. Further, however, it is possible for the multilayer mirror to be applied to a spherically curved surface of a substrate. Further still, the surface of the substrate can have an aspherical curvature, for instance a parabolic or elliptical curvature. A parabolically curved surface, for instance, is suitable for creating a substantially parallel beam from a radiation source that is approximately point-shaped, whereas an elliptically curved surface is suitable for focusing the beam from a radiation source positioned at a first focal point of the ellipse at the second focal point of the ellipse.

A multilayer mirror in accordance with the invention can, for instance, be used for components for beam guidance and/or forming the beam from a source of EUV radiation; in particular it can be used for plane mirrors for beam reflection, or for curved mirrors for collimating or focusing the radiation.

Because the reflectivity exhibits a very narrow spectral band, with a full width at half maximum of, for instance, about 0.5 nm or less, a multilayer mirror in accordance with the invention is also suitable for application in spectrometers, in particular for characterizing EUV radiation sources.

DETAILED DESCRIPTION OF THE DRAWINGS

Elements in the figures that are either identical, or have the same effect as one another, are given the same reference numbers.

Figure 1:
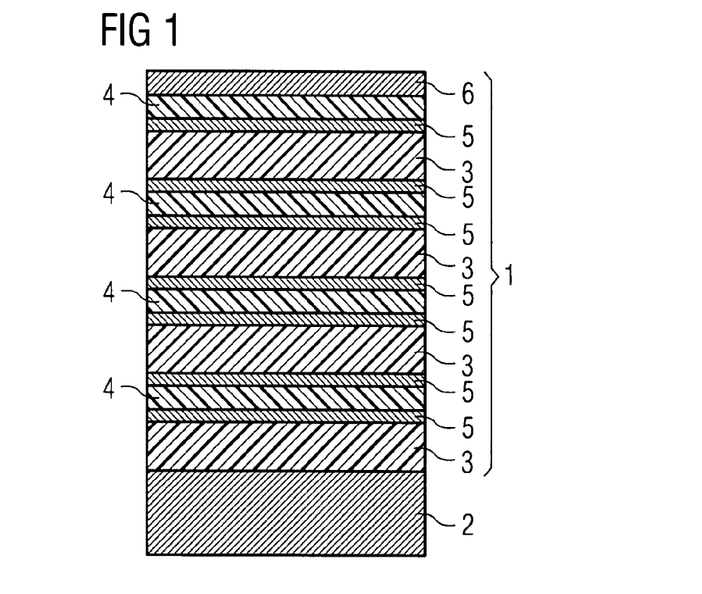
FIG. 1: a schematic illustration of a cross-section through an embodiment of a multilayer mirror in relationship to the wavelength λ of three further accordance with the invention.

In the first embodiment of the invention shown on FIG. 1, a multilayer mirror 1 consisting of alternating layers of silicon 3 and molybdenum 4 are applied to a substrate 2, whereby one silicon layer 3 and a neighbouring layer of molybdenum 4 constitute one pair of layers. To simplify the illustration, only four pairs of layers are illustrated. A favourable number of pairs of layers lies in the range from 40 to 70.

Within the multilayer mirror 1, a barrier layer 5 made of a silicon nitride or of a silicon boride is incorporated at all the interfaces; in other words, both those interfaces where, in the direction of growth, a silicon layer 3 follows a molybdenum layer 4, as well as those interfaces where, in the direction of growth, a molybdenum layer 4 follows a silicon layer 3. A pure layer is preferred of either silicon nitride or silicon boride, but is not essential. The thickness of the barrier layers 5 is favourably in the range of about 0.1 nm up to 1 nm, with a range between 0.2 nm up to 0.5 nm being particularly favourable. The barrier layers 5 prevent both interdiffusion and the formation of molybdenum silicide at the interfaces between the molybdenum layers 4 and the silicon layers 3. In this way the thermal stability of the multilayer mirror 1 is improved, particularly over the temperature range from about 300° C. to 500° C.

The substrate 2 can, for instance, be a semiconductor substrate, particularly one consisting of silicon or of SiC, or a substrate of glass or of a glass ceramic, particularly a glass ceramic with a low coefficient of thermal expansion. Favourably, the substrate 2 has a surface roughness of less than 0.2 nm.

The multilayer mirror 1 is favourably applied to a substrate 2 by sputtering, and in particular using DC magnetron sputtering whereby argon, for instance, is used as the working gas. In the context of the invention, however, other coating procedures may be considered, in particular electron beam evaporation, plasma-ion-assisted deposition (PIAD) or laser ablation.

The multilayer mirror 1 favourably has a covering layer 6 that does not consist of either silicon or molybdenum. The thermal stability of the multilayer mirror 1 can be further increased through the selection of a material for the covering layer 6 that is relatively resistant to oxidation. It is particularly advantageous if the covering layer 6, like the barrier layers 5, is formed of a silicon boride or a silicon nitride. In this case the complexity of manufacture is advantageously low, since the application of the covering layer 6 does not require any special preparations for coating with a further substance not already included in the rest of the multilayer mirror 1.

Figure 2:
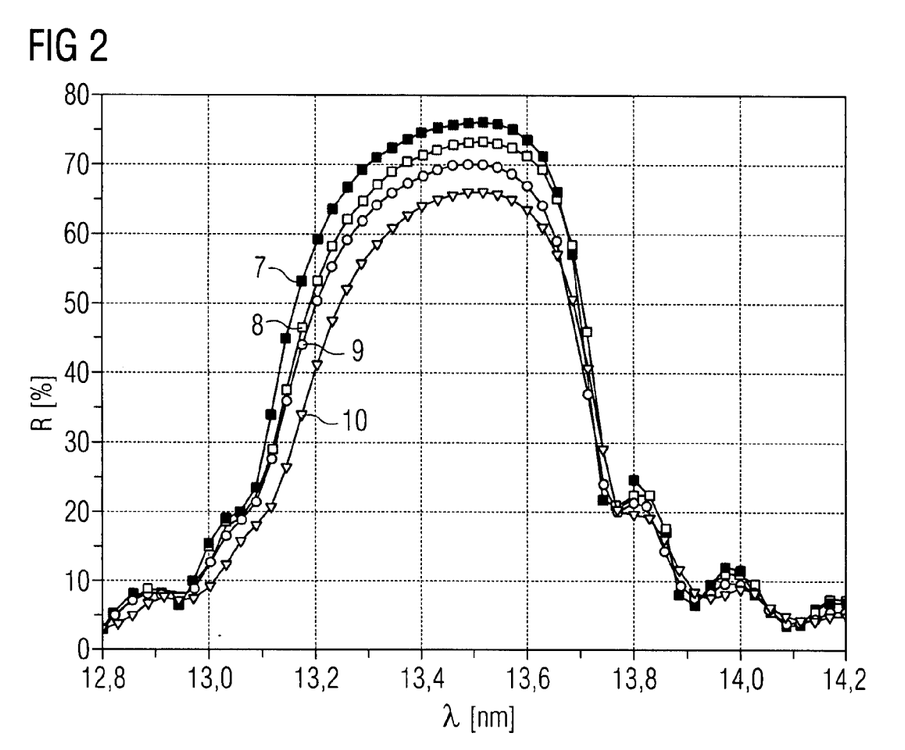
FIG. 2: a graph illustrating the reflection R in embodiments of a multilayer mirror in accordance wih the invention, in comparison with a conventional Mo/Si multilayer mirror.

FIG. 2 shows a graphical representation of the reflectivity R for perpendicularly incident radiation in relation to the wavelength λ for a conventional multilayer mirror not incorporating barrier layers (Curve 7) in comparison with three embodiments of multilayer mirrors in accordance with the invention, in which a barrier layer of $Si_3N_4$ is included at all the interfaces between molybdenum layers and silicon layers, where the thickness of the barrier layers in each case is 0.3 nm (Curve 8), 0.6 nm (Curve 9) and 0.9 nm (Curve 10). The thicknesses of the layers of the multilayer mirror on which this simulation is based are optimized for maximum reflectivity at a wavelength λ of 13.5 nm. The period thickness of the multilayer mirror is approximately 6.9 nm, and the number of layer pairs in each case is 60.

The multilayer mirrors in accordance with the invention are characterized by high thermal stability, while the reduction in reflectivity resulting from the barrier layers that have been introduced in comparison with conventional multilayer mirrors without barrier layers is favourably small. For instance, the simulated maximum reflectivity for barrier layers 0.6 nm thick (Curve 9) is approximately 70%. With barrier layers 0.9 nm thick, the reduction in reflectivity in comparison with conventional multilayer mirrors is about 10 percent. Even with these comparatively thick barrier layers, the maximum reflectivity is more than 65%.

Figure 3:
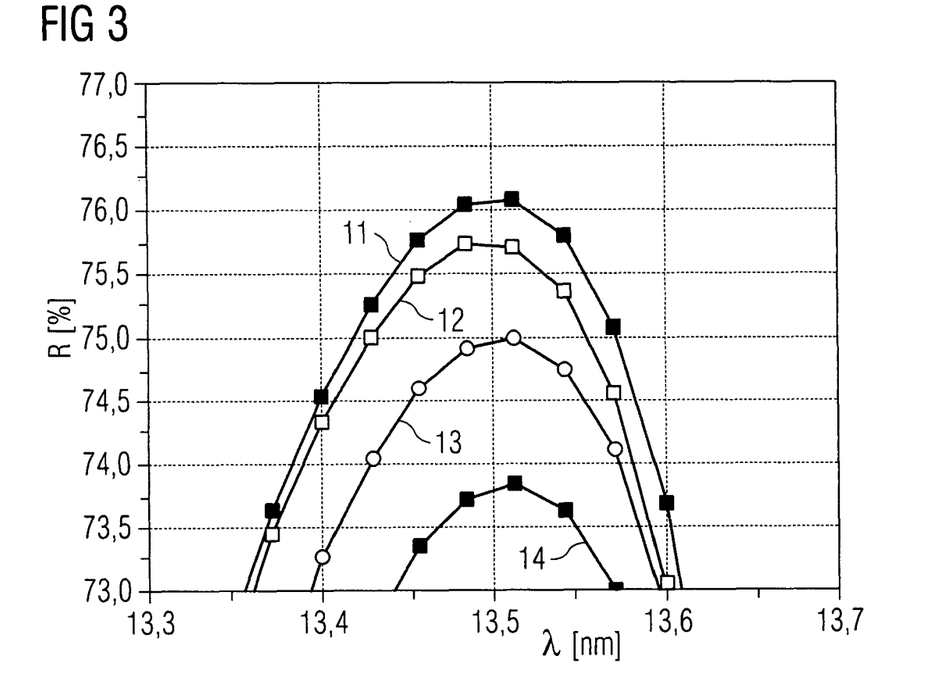
FIG. 3: a graph illustrating the reflection R in relationship to the wavelength λ of three further embodiments of a multilayer mirror in accordance with the invention, in comparison with a conventional Mo/Si multilayer mirror.

FIG. 3 shows a graphical representation of the reflectivity R for perpendicularly incident radiation in relation to the wavelength λ for a conventional multilayer mirror not incorporating barrier layers (Curve 11) in comparison with three embodiments of multilayer mirrors in accordance with the invention, in which a barrier layer of $SiB_4$ is included at all the interfaces between molybdenum layers and silicon layers, where the thickness of the barrier layers in each case is 0.3 nm (Curve 12), 0.6 nm (Curve 13) and 0.9 nm (Curve 14). Because, as a result of the small differences in the reflectivity, the reflectivity curves shown in FIG. 3 would otherwise be hard to distinguish, a scaling has been chosen for FIG. 3, in contrast to FIG. 2, such that only the immediate neighbourhood of the reflectivity maximum is displayed. The thicknesses of the layers of the multilayer mirror on which this simulation is based are optimized for maximum reflectivity at a wavelength λ of 13.5 nm. As in the embodiment described in association with FIG. 2, the period thickness of the multilayer mirror is approximately 6.9 nm, and the number of pairs of layers in each case is 60.

The reduction in the reflection caused by the $SiB_4$ barrier layers in comparison with a conventional multilayer mirror without barrier layers is, favourably, even smaller than when barrier layers consisting of a silicon nitride are used. In particular, the maximum reflectivity even for barrier layers of $SiB_4$ that are 0.9 nm thick (Curve 14) is only reduced by less than 3% in comparison with a conventional multilayer mirror.

Figure 4:
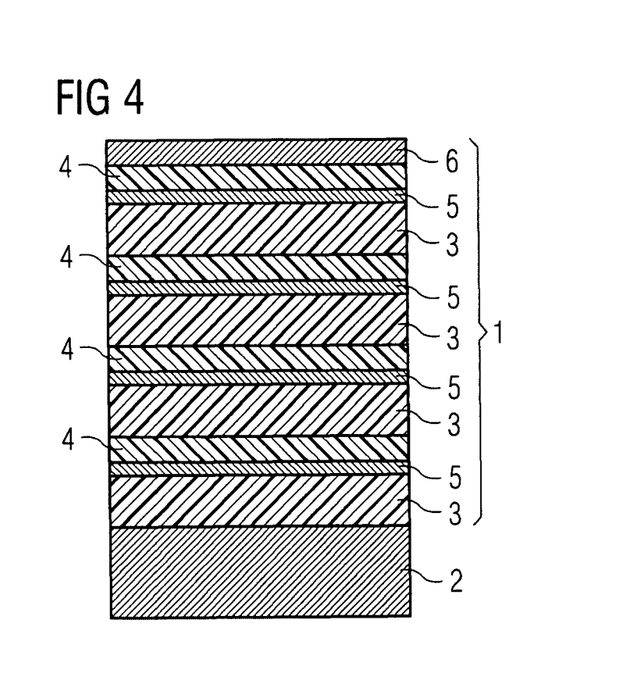
FIG. 4: a schematic illustration of a cross-section through a further embodiment of a multilayer mirror in accordance with the invention.

In the embodiment of a multilayer mirror in accordance with the invention illustrated in FIG. 4, barrier layers 5 of a silicon nitride or a silicon boride are only positioned at those interfaces where, in the direction of growth, a molybdenum layer 4 follows a silicon layer 3. The barrier layers 5 in this embodiment of the invention are positioned at places within the multilayer mirror that coincide with the nodes of the electrical field strength. In this case, the reflectivity in the presence of the barrier layers 5 is only slightly reduced in comparison with a conventional multilayer mirror that does not incorporate barrier layers.

In this embodiment of the invention, the interdiffusion and the formation of silicide at the interfaces where a molybdenum layer 4 follows a silicon layer 3 is reduced by the barrier layers 5. This is particularly favourable because these interfaces, as is, for instance, known from U.S. Pat. No. 6,396,900 B1, are more strongly affected by interdiffusion and the formation of silicide in conventional Mo/Si multilayer mirrors than those interfaces where a silicon layer follows a molybdenum layer.

Figure 5:
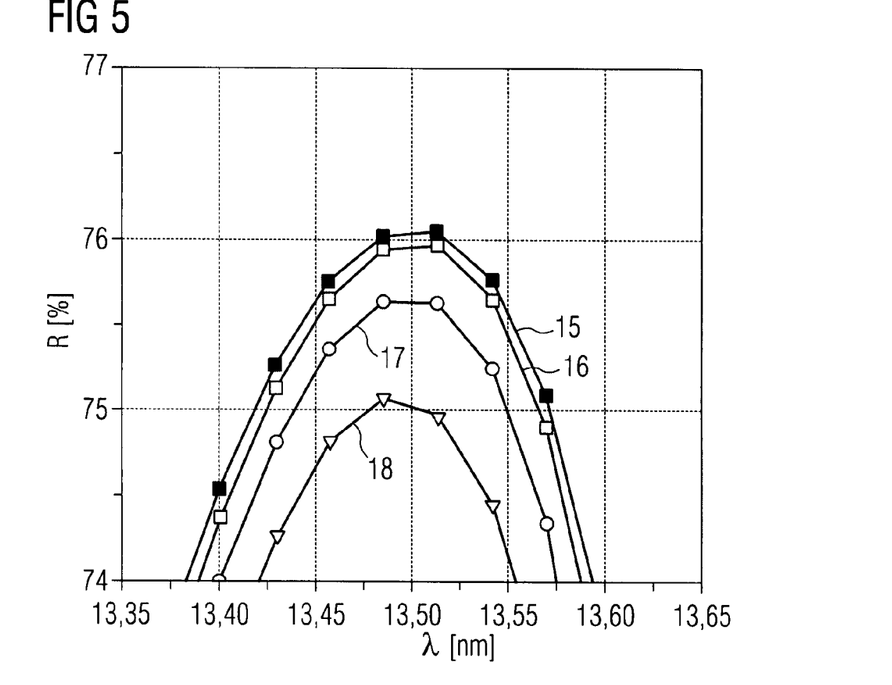
FIG. 5: a graph illustrating the reflection R in relationship to the wavelength λ of three further embodiments of a multilayer mirror in accordance with the invention, in comparison with a conventional Mo/Si multilayer mirror.

FIG. 5 shows a graphical representation of the reflectivity R for perpendicularly incident radiation in relation to the wavelength λ for a conventional multilayer mirror not incorporating barrier layers (Curve 15) in comparison with three embodiments of multilayer mirrors in accordance with the invention, in which a barrier layer of $Si_3N_4$ is included only at those interfaces where, in the direction of growth, a molybdenum layer follows a silicon layer, where the thickness of the barrier layers in each case is 0.3 nm (Curve 16), 0.6 nm (Curve 17) and 0.9 nm (Curve 18). The number of pairs of layers in the multilayer mirror is 60, and the period thickness is approximately 6.9 nm.

The reflectivity curves shown on FIG. 5 make it clear that the introduction of barrier layers at all those interfaces where a molybdenum layer follows a silicon layer has only resulted in an extremely slight reduction in the reflectivity. Because in these embodiments of multilayer mirrors the barrier layers of silicon nitride are each located at the nodes of the electric field within the multilayer mirror, they only have a slight effect on the reflectivity. The reduction in reflectivity even when barrier layers of $Si_3N_4$ that are, for instance, 0.9 nm thick are used (Curve 18) in comparison with a conventional multilayer mirror (Curve 15) is only about 1%.

Figure 6:
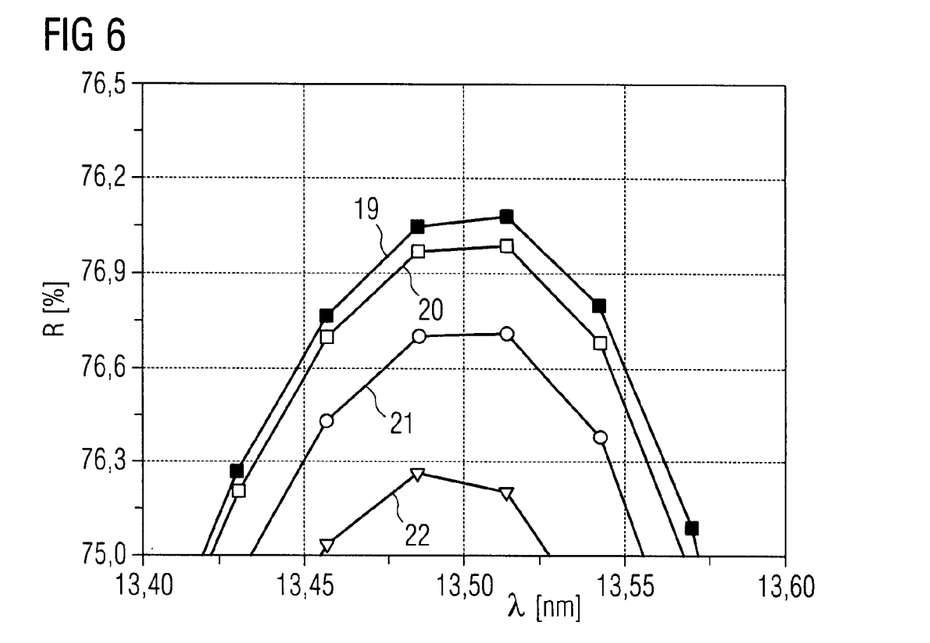
FIG. 6: a graph illustrating the reflection R in relationship to the wavelength λ of three further embodiments of a multilayer mirror in accordance with the invention, in comparison with a conventional Mo/Si multilayer mirror.

FIG. 6 shows a graphical representation of the reflectivity R for perpendicularly incident radiation in relation to the wavelength λ for a conventional multilayer mirror not incorporating barrier layers (Curve 19) in comparison with three embodiments of multilayer mirrors in accordance with the invention, in which a barrier layer of $SiB_4$ is included only at those interfaces where, in the direction of growth, a molybdenum layer follows a silicon layer, where the thickness of the barrier layers in each case is 0.3 nm (Curve 20), 0.6 nm (Curve 21) and 0.9 nm (Curve 22). The number of pairs of layers in the multilayer mirror is 60, and the period thickness is approximately 6.9 nm. In these embodiments of the invention, the reduction in the reflection resulting from the barrier layers of $SiB_4$ is even less than is the case in the embodiments illustrated on FIG. 5 incorporating $Si_3N_4$ barrier layers. Barrier layers of $SiB_4$ that are 0.9 nm thick (Curve 22) cause a reduction in reflectivity in comparison with a conventional multilayer mirror without barrier layers (Curve 19) of only about 0.6%.

Figure 7:
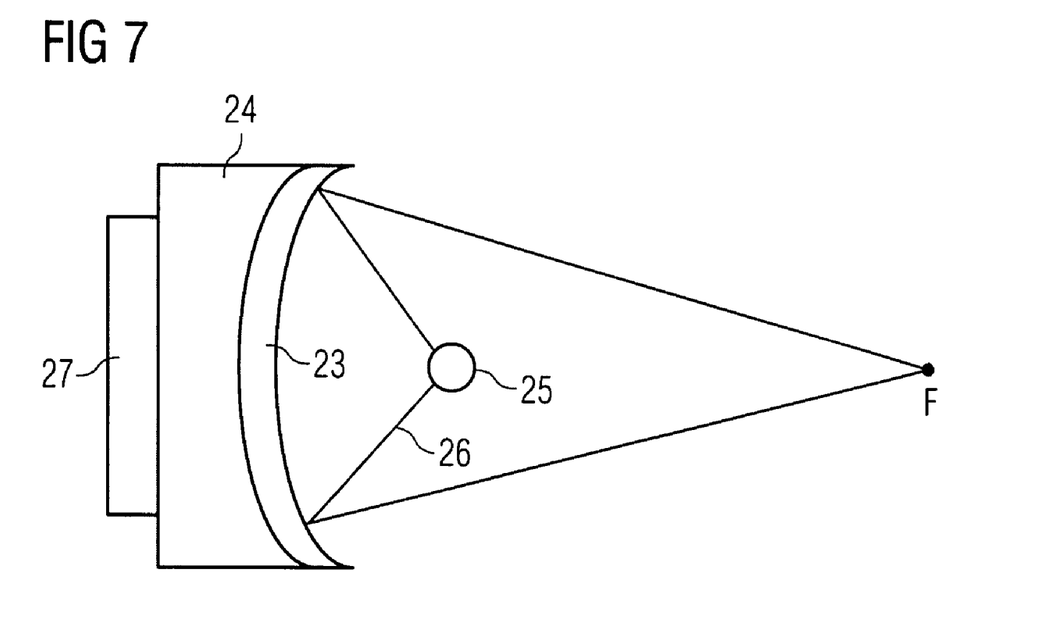
FIG. 7: a schematic illustration of an arrangement in which an embodiment of a multilayer mirror in accordance with the invention is used as the collector mirror for an EUV radiation source.

FIG. 7 shows a schematic illustration of an implementation of a multilayer mirror 23 in accordance with the invention that has been applied to a curved, preferably an aspherically curved, substrate 24. The multilayer mirror 23 functions as the collector mirror for an EUV radiation source 25. The EUV radiation 26 emitted by the EUV radiation source 25 is focused by the collector mirror at, for instance, a focal point F. The EUV radiation source 25 consists, for instance, of a laser-plasma radiation source in which target material, droplets of lithium for example, is excited by laser radiation to emit EUV radiation. In EUV radiation sources of this type, the problem of optical elements positioned in the region of the radiation source becoming contaminated by the target material often occurs. In the multilayer mirror 23 this problem is solved by attaching heating equipment 27 to the substrate 24; the heater raises the multilayer mirror 23 to a temperature such that the target material from the EUV radiation source 25 has only a low coefficient of adhesion, and is therefore desorbed from the surface 28 of the multilayer mirror 23. The multilayer mirror 23 is favourably heated to an operating temperature of around 400° C. or more. A temperature of about 400° C. is particularly favourable in the case of a lithium target.

The invention is not limited to the descriptions of the particular embodiments. The invention, rather, comprises every new feature and every combination of features, including in particular every combination of features in the patent claims, even if this feature or this combination itself is not explicitly quoted in the patent claims or in the embodiments.

The invention claimed is:

1. A multilayer mirror for extreme ultraviolet radiation comprising a plurality of alternating molybdenum layers and silicon layers, wherein at a plurality of interfaces between a molybdenum layer and a neighboring silicon layer, there is a barrier layer containing a silicon boride and wherein at interfaces where, in the direction of growth, a molybdenum layer follows a silicon layer, there is a barrier layer containing a silicon boride, and at interfaces where, in the direction of growth, a silicon layer follows a molybdenum layer, there is no such barrier layer.

2. A multilayer mirror in accordance with claim 1, wherein the barrier layer has a thickness in the range between 0.2 nm and 0.8 nm.

3. A multilayer mirror in accordance with claim 1, wherein the multilayer mirror has at least one covering layer that does not consist of either silicon or molybdenum.

4. A multilayer mirror in accordance with claim 3, wherein the covering layer contains a silicon boride.

5. A multilayer mirror in accordance with claim 3, wherein the covering layer contains an oxide, silicide, nitride, carbide or boride or at least one of the materials ruthenium, rhodium, scandium or zirconium.

6. A multilayer mirror in accordance with claim 1, wherein the multilayer mirror is applied to a curved surface of a substrate.

7. A multilayer mirror in accordance with claim 6, wherein the surface of the substrate has aspherical curvature.

8. A multilayer mirror in accordance with claim 1, wherein heating equipment is provided in order to heat the multilayer mirror up to an operating temperature of 300° C. or more.

9. A multilayer mirror in accordance with claim 8, wherein the multilayer mirror is applied to a substrate to which the heating equipment is attached.

10. A multilayer mirror in accordance with claim 1, wherein the multilayer mirror is a collector mirror for an extreme ultraviolet radiation source.

11. A multilayer mirror in accordance with claim 1, wherein heating equipment is provided in order to heat the multilayer mirror up to an operating temperature of 400° C. or more.

12. A multilayer mirror for extreme ultraviolet radiation comprising a plurality of alternating molybdenum layers and silicon layers, wherein at a plurality of interfaces between a molybdenum layer and a neighboring silicon layer, there is a barrier layer containing a silicon nitride, wherein at interfaces where, in the direction of growth, a molybdenum layer follows a silicon layer, there is a barrier layer containing a silicon nitride, and at interfaces where, in the direction of growth, a silicon layer follows a molybdenum layer, there is no such barrier layer.

13. A multilayer mirror in accordance with claim 12, wherein the barrier layer has a thickness in the range between 0.2 nm and 0.8 nm.

14. A multilayer mirror in accordance with claim 12, wherein the multilayer mirror has at least one covering layer that does not consist of either silicon or molybdenum.

15. A multilayer mirror in accordance with claim 14, wherein the covering layer contains a silicon boride.

16. A multilayer mirror in accordance with claim 14, wherein the covering layer contains an oxide, silicide, nitride, carbide or boride or at least one of the materials ruthenium, rhodium, scandium or zirconium.

17. A multilayer mirror in accordance with claim 12, wherein the multilayer mirror is applied to a curved surface of a substrate.

18. A multilayer mirror in accordance with claim 17, wherein the surface of the substrate has aspherical curvature.

19. A multilayer mirror in accordance with claim 12, wherein heating equipment is provided in order to heat the multilayer mirror up to an operating temperature of 300° C. or more.

20. A multilayer mirror in accordance with claim 19, wherein the multilayer mirror is applied to a substrate to which the heating equipment is attached.

21. A multilayer mirror in accordance with claim 12, wherein the multilayer mirror is a collector mirror for an extreme ultraviolet radiation source.

22. A multilayer mirror in accordance with claim 12, wherein heating equipment is provided in order to heat the multilayer mirror up to an operating temperature of 400° C. or more.

* * * * *